(12) United States Patent
Nolan

(10) Patent No.: US 6,279,861 B1
(45) Date of Patent: Aug. 28, 2001

(54) ELEVATOR CLIPS FOR PORTABLE COMPUTER

(76) Inventor: William B. Nolan, 3704 Fisher Rd., Skaneateles, NY (US) 13152

(*) Notice: Subject to any disclaimer, the term of this patent is extended or adjusted under 35 U.S.C. 154(b) by 0 days.

(21) Appl. No.: 09/657,842

(22) Filed: Sep. 8, 2000

(51) Int. Cl.$^7$ .................................................. F16M 11/20
(52) U.S. Cl. ...................... 248/188.2; 248/688; 248/689; 248/918; 361/683; 361/684
(58) Field of Search ................... 248/188.2, 649, 248/677, 188.4, 188.3, 188.8, 188.9, 676, 918, 688, 689, 650, 351, 228.6, 231.71; 361/683, 684; 400/682

(56) References Cited

U.S. PATENT DOCUMENTS

| | | | |
|---|---|---|---|
| D. 296,212 | 6/1988 | Arney | D14/114 |
| D. 319,822 | 9/1991 | Troke | D14/114 |
| 1,681,732 | * 8/1928 | Gray | 248/188.4 |
| 2,107,629 | * 2/1938 | Dallas | 248/188.4 |
| 2,680,326 | * 6/1954 | Sultan | 248/188.4 |
| 2,803,510 | * 8/1957 | Carbary | 248/188.4 |
| 2,998,476 | * 8/1961 | Nix | 248/188.4 |
| 4,490,012 | * 12/1984 | Magiske | 248/466 |
| 4,773,783 | 9/1988 | Dickie | 400/682 |
| 4,915,334 | * 4/1990 | White | 248/188.4 |
| 5,145,270 | * 9/1992 | Darden | 400/488 |
| 5,219,136 | * 6/1993 | Hassel et al. | 248/118 |
| 5,297,003 | 3/1994 | Nomura et al. | 361/680 |
| 5,337,985 | 8/1994 | Hale | 248/174 |
| 5,347,424 | 9/1994 | Akahane | 361/680 |
| 5,469,327 | 11/1995 | Cheng | 361/680 |
| 5,503,361 | 4/1996 | Kan-O et al. | 248/688 |
| 5,546,271 | 8/1996 | Gut et al. | 361/680 |
| 5,732,928 | 3/1998 | Chang | 248/688 |
| 5,894,406 | * 4/1999 | Blend et al. | 361/680 |
| 6,023,800 | * 2/2000 | Stickley | 248/229.26 |

* cited by examiner

Primary Examiner—Anita King
Assistant Examiner—Kimberly Wood
(74) Attorney, Agent, or Firm—Bernhard P. Molldrem, Jr.

(57) ABSTRACT

A pair of elevator clamps are used with a portable computer for tilting the main body and keyboard unit. The elevator clips fit onto rearward parts of the sides of portable computer body unit. The clips have an upper plate and a lower plate with riser joining the upper and lower plates. A support pedestal extends downward below the lower plate member to rest on a support surface and define an amount of incline for the body and keyboard unit. In one embodiment, the clip has a generally F-shaped profile, and the pedestal has a front-to-back taper at its lower edge. In another embodiment, the elevator clip has a threaded post passing through a brace at the lower end of the riser, and the post adjustably supports the lower plate member. The threaded post serves as pedestal. There can be a footing member of hard rubber or other suitable material affixed onto the lower end of the threaded post, for non-slip support on the table or other surface. The footing also facilitates gripping for rotating the threaded post.

7 Claims, 1 Drawing Sheet

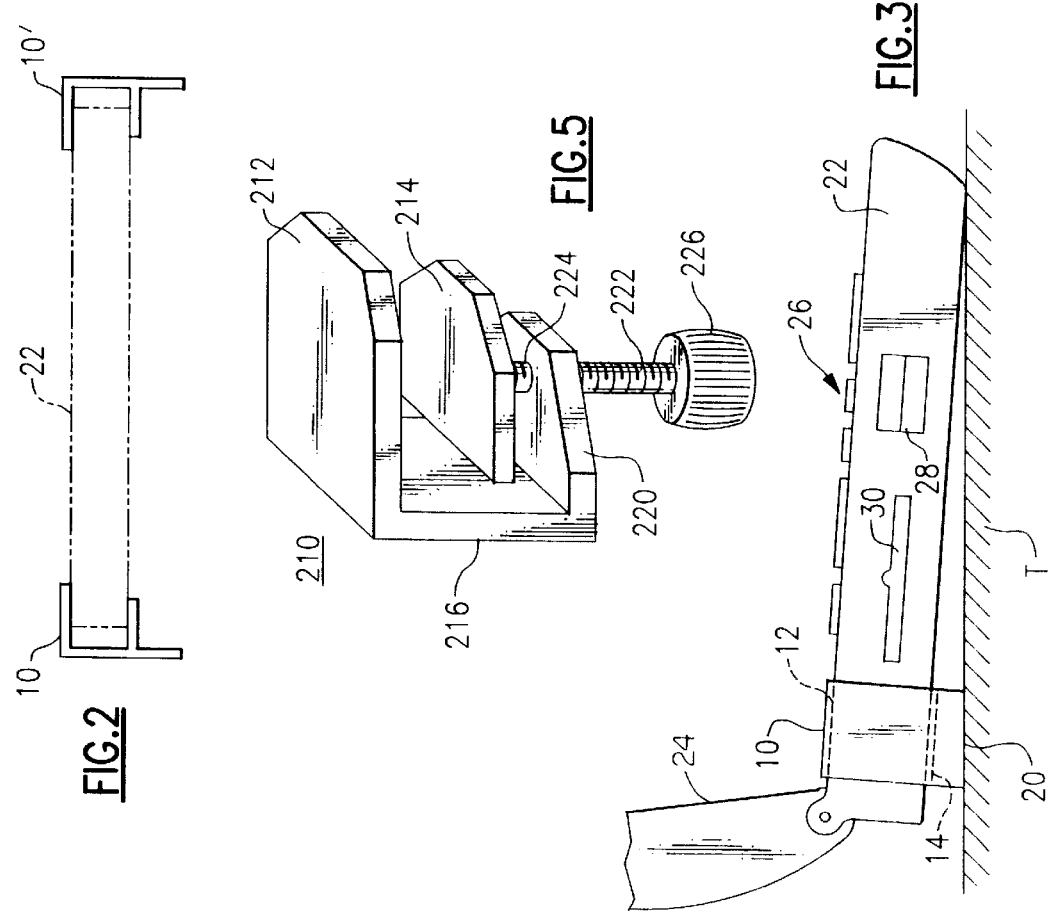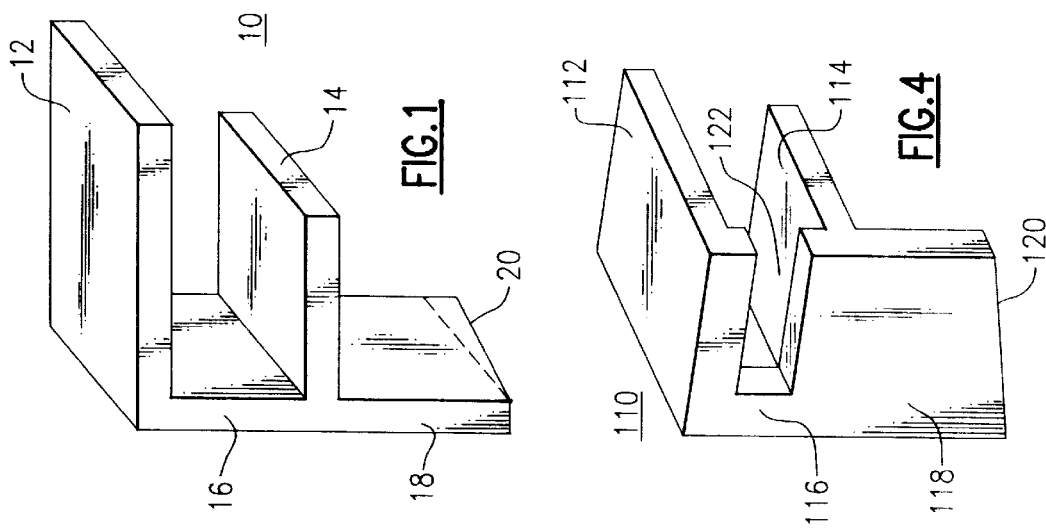

ELEVATOR CLIPS FOR PORTABLE COMPUTER

BACKGROUND OF THE INVENTION

This invention is directed to portable computers, e.g., laptop or notebook computers, and is more particularly concerned with an accessory for elevating the rear part of the body portion of the portable computer so that it has a front to back tilt or slope for comfort in using the keyboard.

Laptop computer, notebook computers and other small portable computers have enjoyed great popularity in recent years. These computers are generally self-contained, having a body portion with a keyboard on its upper wall, and a viewing screen that is hinged to the body portion and easily folds down for storage and carrying. Portable computers are typically battery powered, and can be set up for use on any convenient table or desk.

The main body portion of the computer is a box-like case containing the electronics and drives, with the keyboard and other touch controls located on the top wall. There are also various cable access ports, access to internal CD ROM drive and floppy drive, and access port for dial-up modem located along the side walls. Typically, the bottom wall may have a maintenance access panel, and panels or doors that permit change-out of battery, or adding RAM chips or other devices. Various makers of portable computers may have different configurations, but most have this same general configuration. Consequently, when the portable computer is set up for use, the keyboard lies horizontal, i.e., parallel to the table or desk on which it is supported. This is not an optimum arrangement for user comfort, and it is often desirable to provide the keyboard with a slant or tilt so that the rear of the computer body portion is elevated in respect to the front.

Various proposals have been made for elevating the rear of the keyboard portion of a portable computer. Cheng U.S. Pat. No. 5,469,327 and Akahane U.S. Pat. No. 5,347,424 address this by including swing-down foot members into the case of the computer. In each case these have to be built in as part of the original equipment, and it is difficult to retro-fit the tilting feature to an existing portable computer. Hale U.S. Pat. No. 5,337,985 relates to a V-shaped support device that attaches to the base of a portable computer by means of Velcro strips. This arrangement requires that Velcro strips be adhesively applied onto specific locations on the bottom of the laptop or notebook computer.

OBJECT AND SUMMARY OF THE INVENTION

Accordingly, it is an object of this invention to provide a means for elevating the keyboard and body unit of a portable computer, which is more convenient and inexpensive to use than the devices of the prior art.

It is another object to provide elevator clips for a portable computer which clip onto the side walls of the body and keyboard portion of the computer, and which provide an optimal tilt or slant to the keyboard for user comfort.

It is a further object of this invention to provide improved means for elevating the rear part of the portable computer to create a desired tilt or slant and facilitate user comfort in using the keyboard.

It is another object to provide a pair of elevator clamps that fit onto the sides of the portable computer main body and keyboard unit, and which have pedestals or support legs that lift the rear part of the computer above the surface of a table or desk.

It is still another object to provide elevator clamps that can be used on a portable computer without having to modify the case of the computer, and which are inexpensive and durable.

According to an aspect of the invention, a pair of elevator clamps are used with a portable computer of the type that has a screen portion and a body and keyboard portion. The latter has a case with top wall, a bottom wall, and left and right sides, with the top and bottom walls defining a predetermined thickness for the case. The computer keyboard is integrated into the top wall of the case. Respective left and right elevator clips are fitted onto rearward parts of the left and right sides of said portable computer body and keyboard portion. Each of the elevator clips includes an upper plate member and a lower plate member. A riser joins the upper and lower plate members and holds the upper and lower plate members at a separation that corresponds to the thickness of the case. Each of the clips fits snugly when installed on a respective side of the body and keyboard portion. Also, for each elevator clip there is a support pedestal extending downward below the lower plate member to rest on a support surface and define an amount of incline for the body and keyboard portion.

In one embodiment, the elevator clip has the support pedestal extending downward substantially in line with the riser member, so that the clip has a generally F-shaped profile. In this case, the pedestal can have a front-to-back taper at its lower edge so that it rests flat on the work table.

In another embodiment, the elevator clip has the riser member joined to the upper plate member and a brace extends parallel to the upper member. The brace has a socket or threaded aperture. A threaded post passes through said threaded aperture and its an upper end adjustably supports the lower plate member. The threaded post serves as pedestal with its lower end resting upon the support surface. There can be a footing member of hard rubber or other suitable material affixed onto the lower end of the threaded post, for non-slip support on the table or other surface. The footing also facilitates gripping for rotating the threaded post.

The above and many other objects, features, and advantages of this invention will become apparent from the ensuing detailed description of the preferred embodiments, which is illustrated in the accompanying Drawing.

BRIEF DESCRIPTION OF THE DRAWING

FIG. 1 is a perspective view of an elevator clip for a portable computer according to a first embodiment the invention.

FIG. 2 is a schematic view of a pair of elevator clips of this embodiment used in connection with a portable computer.

FIG. 3 is a side elevation of a personal computer and an elevator clip of this embodiment.

FIG. 4 is a perspective view of an elevator clip of a second embodiment of this invention.

FIG. 5 is a perspective view of an elevator clip of a third embodiment of this invention.

DETAILED DESCRIPTION OF A PREFERRED EMBODIMENT

Now with reference to the Drawing, FIG. 1 shows a one-piece molded or extruded clip 10 according to this invention. The clip 10 has an upper plate member 12 and a lower plate member 14 below it and parallel to it. The spacing between the two plates is intended to be the same as the thickness of a portable computer, as discussed below. There is a vertical riser member 16 connecting one end of the upper plate 12 with the corresponding end of the lower plate 14. The upper and lower plate members 12, 14 and the riser member 16 together have a more-or-less C-shaped profile. A flat support pedestal 18 that continues downward from the riser 16 to support the lower plate 14 above a table or other flat surface. The support pedestal 18 has a tapered lower edge 20 that matches the intended slope or tilt of the computer, so that the clip 10 rests flat on the supporting surface. There is a mirror-image clip 10' provided also, such that the clip 10 fits onto one side of the computer body 22, as shown in FIG. 2, and the other clip 10' fits onto the opposite side of the computer body 22.

Typically, as shown in FIG. 3, a notebook computer, laptop computer or other portable computer includes the computer main body and keyboard unit 22 and an attached screen unit 24, hinged to a back edge of the main body and keyboard unit 22. The latter unit 22 typically has a boxlike case, with a flat bottom, a flat top on which a keyboard 26 and other control devices are located, and side walls. There are ports 28 typically located on one or another of the side walls, for connecting to cables for printer, external drives, or phone lines. There may also be drives 30, such as a floppy disk drive or a CD ROM drive. The elevator clip 10 fits snugly onto a rear part of the main computer body unit 22, near the screen unit 24, and elevates the rear part up relative to the front of the computer body unit. The front of the unit 22 and the bottom 20 of the clip rest on a horizontal table top T or similar horizontal surface.

For one typical embodiment, the upper and lower plate members 12, 14 can have a dimensions of about 1⅝ inches by ⅝ inch, and the riser member 16 defines a separation between the upper and lower plate members of about 1 1/16 inch. The support pedestal 18 here extends down a distance of about 1 1/16 inch. This can vary with the make and model of portable computer, although the same set of elevator clips 10 and 10' may fit a number of different computers. As mentioned, the elevator clip 10 can be molded as a unit from a suitable material, such a tough plastic resin. In that case, a reinforcing insert may be used. It is also possible to extrude a metal or plastic material into a suitable F-shaped profile, and to cut the extrusion to form the clips. There may be a rubber-like or other accommodating material used on the lower surface of the plate member 12 and the upper surface of the plate member 14, to make the hold of the clip onto the computer somewhat more secure. A gripping, high-friction or non-slip material may be applied on the lower edge 20 The support pedestal 18 can be located elsewhere on the lower plate 14, or there can be more than one support pedestal 18, without departing from the principles of the invention.

An alternative embodiment is shown in FIG. 4, wherein the same elements as described in respect to the embodiment of FIG. 1 are identified with the same reference numbers, but raised by 100. Here the clip 110 has an upper plate member 112, a lower plate member 114, a riser member 116, and a support pedestal 18. Here, in order to accommodate the possibility that there are cable ports that the elevator clip might obstruct, there is a cutout 122 in the riser member 116 to serve as an access aperture, and permit cable access through the cutout.

A further embodiment of the invention is shown in FIG. 5. Here, a thumbscrew-based elevator clip 210 has an upper plate 212 and an adjustable lower plate 214. There is a riser member 216 joined to the upper plate 212, and there is a horizontal member or brace 220 joined to the lower end of the riser member 216. A vertical threaded post 222 passes through a female threaded aperture or fitting 224 in the brace 220, and the lower plate 214 is supported on the top of the post 216. The threaded post 222 can be twisted by hand to raise and lower the plate 214 so that the clip fits snugly onto the side of the portable computer. The threaded post then becomes the support pedestal. A footing 226, which can be rubber, hard plastic, or other suitable material, is secured onto the lower end of the threaded post 222, and assists the user in gripping for adjustment, and also serves as a more secure (i.e., non-slip) resting point to contact the table or other surface.

The clips of this invention can be used with the portable computer both when it is operating on battery and when it is connected by a cord to an AC outlet or any electrical outlet. Also, the clips of this invention can be used with other equipment besides portable computers where some elevation or tilt is desired.

While the invention has been described hereinabove with reference to a few preferred embodiments, it should be apparent that the invention is not limited to such embodiments. Rather, many variations would be apparent to persons of skill in the art without departing from the scope and spirit of this invention, as defined in the appended Claims.

I claim:

1. In combination, a portable computer which comprises a body and keyboard portion having a top wall, a bottom wall, and left and right sides, said top and bottom walls defining a predetermined thickness for said body and keyboard portion; and respective individual left and right elevator clips fitted onto rearward parts of the left and right sides of said portable computer body and keyboard portion, each said elevator clip including an upper plate member, a lower plate member, a riser joining the upper and lower plate member and holding said upper and lower plate portions at a separation dimensioned to correspond to the predetermined thickness of said body and keyboard portion of said portable computer such that the clip fits snugly when installed on a respective side of the body and keyboard portion; and a support pedestal extending downward below said lower plate member to rest on a support surface and define an amount of incline for said body and keyboard portion.

2. The combination of claim 1 wherein each said elevator clip has said support pedestal extending downward substantially in line with said riser member, such that the clip has a generally F-shaped profile.

3. The combination of claim 2 wherein each said support pedestal has a front to back taper at a lower edge thereof.

4. The combination of claim 1 wherein each of said clips is unitarily molded of a plastic resin.

5. The combination of claim 1 wherein said riser portion has an access aperture formed therein for permitting cable access to a port in the side of said portable computer body and keyboard portion.

6. In combination, a portable computer which comprises a body and keyboard portion having a top wall, a bottom wall, and left and right sides, said top and bottom walls defining a predetermined thickness for said body and keyboard portion; and respective left and right elevator clips fitted onto rearward parts of the left and right sides of said portable computer body and keyboard portion, each said elevator clip including an upper plate member, a lower plate member and a riser member joined to the upper plate member and extending vertically downward therefrom, with a brace extending from a lower end of said riser parallel to said upper member and having a threaded aperture therein, a threaded post extending vertically through the threaded aperture in said brace, with said lower plate member being supported on an upper end of said threaded post, said post being rotatable to define an adjustable spacing between the upper and lower plate members such that the latter fit snugly against the top and bottom walls of said portable computer body and keyboard portion, with said post defining a pedestal for tilting said body and keyboard portion.

7. The combination of claim 6 each said elevator clip further comprising a footing member secured onto the lower end of the threaded post.

* * * * *